(12) United States Patent
Commercial

(10) Patent No.: US 6,317,825 B1
(45) Date of Patent: Nov. 13, 2001

(54) MICROPROCESSOR COMPRISING BIT CONCATENATION MEANS

(75) Inventor: Sean Commercial, Aix en Provence (FR)

(73) Assignee: Inside Technologies, Saint Clement les Places (FR)

( * ) Notice: Subject to any disclaimer, the term of this patent is extended or adjusted under 35 U.S.C. 154(b) by 0 days.

(21) Appl. No.: 09/564,093

(22) Filed: May 3, 2000

Related U.S. Application Data

(63) Continuation of application No. PCT/FR98/02266, filed on Oct. 23, 1998.

(30) Foreign Application Priority Data

Nov. 3, 1997 (FR) .................................................. 97 13758

(51) Int. Cl.$^7$ ........................... G06F 9/305; G06F 9/315; G06F 9/38; G06F 9/302
(52) U.S. Cl. .......................... 712/223; 712/213; 712/224; 712/210; 712/221; 708/508; 708/490
(58) Field of Search .................................. 708/490, 508, 708/631, 625, 531; 712/223.43, 224.229, 228.37, 227, 232.221, 222.221, 213.21, 225, 300, 248, 9, 23, 24, 25, 219, 216, 217; 710/129, 130, 122, 111, 68, 49, 50; 714/813, 822

(56) References Cited

U.S. PATENT DOCUMENTS 4,023,023 5/1977 Bourrez et al. ....................... 708/490
4,785,393 * 11/1988 Chu et al. ............................. 712/223
5,144,573 * 9/1992 Greiner ................................. 708/531

FOREIGN PATENT DOCUMENTS 0 438 126 A2   7/1991  (EP) .
0 664 508 A2   7/1995  (EP) .
WO99/23550  *  5/1999  (WO) .

OTHER PUBLICATIONS

Norman P. Jouppi, "The Nonuniform Distribution of Instruction–Level And Machine Parallelism And Its Effect On Performance" *IEEE Transactions On Computers* vol. 38 No. 12 pp. 1645–1658, (Dec. 1, 1989).

Wai Lung Loh, "BEE: A Special–Purpose Machine For Hardware Description Languages" *Microprocessors And Microsystems*, vol. 19, No. 5, pp. 269–276, (Jun. 1, 1995).

\* cited by examiner

*Primary Examiner*—Daniel H. Pan
(74) *Attorney, Agent, or Firm*—Akin, Gump, Strauss, Hauer, Feld, L.L.P.

(57) ABSTRACT

The invention relates to a microprocessor (MP) comprising means to decode (DEC1) a compact instruction (BMV) for the concatenation of at least one bit ($b_i$) of a first binary word (W1) with at least one bit of a second binary word (W2), and means (REGBANK, MUX, BSHIFT) to process this instruction in one clock cycle. Advantages: fast processing of a concatenation operation. Application especially to chip cards.

8 Claims, 2 Drawing Sheets

MICROPROCESSOR COMPRISING BIT CONCATENATION MEANS

CROSS REFERENCE TO RELATED APPLICATION

This Application is a continuation of International Application PCT/FR98/02266, filed Oct. 23, 1998, now International Patent WO99/23550, the disclosure of which is incorporated herein by reference.

BACKGROUND OF THE INVENTION

The present invention relates to microprocessors and more particularly to the performance, in a microprocessor, of an operation to concatenate at least one bit of a first binary word with bits of a second binary word.

The concatenation of bits is an operation frequently used in industrial data processing. In particular, the authentication codes sent out by microprocessor cards such as bankcards are generated by encryption algorithms requiring numerous bit concatenation operations. Now, the standard microprocessors have the drawback of using several clock cycles and several program code bytes (i.e. 8-bit words) to carry out this operation.

For example, with a 6805 type microprocessor, the bit concatenation is done by means of "BRSET" and "BCLR" instructions and requires first of all the one-setting of the bits of a memory zone designed to contain the result of the operation. Then, the value of a first bit to be concatenated is tested and the first bit of the memory zone is set at 0 if the bit to be concatenated is equal to 0. Then, the value of the second bit to be concatenated is tested and the second bit of the memory zone is set at 0 if the second bit to be concatenated is equal to 0, etc. The concatenation of each bit in the memory zone requires five program code bytes (including instructions and addressing of the memory) and the execution time is about ten machine cycles.

In an 8051-type microprocessor, the bit to be concatenated is first of all loaded into a flag, for example the CRY or carry flag. Then, the bit is inserted into the working registers of the microprocessor by shifting the register rightward by means of the instruction "ROR" or by direct insertion by means of the instruction "MOV". Finally, the contents of the working register are loaded into memory. These operations also consume several bytes of code and take several machine cycles.

Ultimately, the prior art microprocessors are slow to execute a program that contains a large number of concatenation operations and, for each concatenation program, they require the writing of several program codes.

There also exist known sophisticated pipeline type microprocessors, namely microprocessors with overlapping of instructions. The advantage of these microprocessors is that they work at high speed. However, these microprocessors have a degree of complexity, space requirement and cost price that makes them unsuitable for integration into chip cards.

In particular, contactless chip cards powered by electromagnetic induction possess low resources in electrical energy and have to be fitted out with a microprocessor that consumes little current while being fast and capable of processing a transaction in a very short period of time of about some microseconds.

There is also the article by Wai Lung Loh, "BEE: a special-purpose machine for hardware description languages", in the journal *Microprocessors and Microsystems*, Vol. 19, No. 5, June 1995, that describes a hardware circuit emulator programmed by means of a specific VHDL (hardware description language). This article proposes to facilitate the simulation of operations to manipulate bit strings by making a hardware circuit called a BEE (bitstring emulator engine) taking charge of the execution of such operations. However, the BEE circuit is complex and is ill suited to incorporation into a microprocessor designed for chip cards.

Finally, the U.S. Pat. No. 4,023,023 describes a hardware circuit used to make several operations for shifting and concatenating bits from two binary words given at input.

SUMMARY OF THE INVENTION

A general goal of the present invention is to provide for a microprocessor that incorporates a bit concatenation hardware circuit and, at the same time, is easy to design and compact, consumes little power and offers high speed of processing of the instructions of the program, especially a concatenation instruction.

This goal is achieved by providing for a pipeline microprocessor comprising means to decode an instruction for the concatenation of at least one bit of a first binary word with at least one bit of a second binary word; a bank of registers; means to process the concatenation instructions; the microprocessor comprising a first pipeline stage comprising means for decoding the concatenation instruction; a second pipeline stage contiguous to the first stage, comprising a first sector comprising concatenation means in which the bank of registers is laid out in read mode and a second sector in which the bank of registers is laid out in write mode, the first sector being active at each clock half-cycle of the microprocessor and the second sector being active at each following clock half-cycle, the means for processing the concatenation instruction being laid out to read the first and second binary words in a bank of registers and execute the concatenation instruction during a first clock half-cycle and record the result of the concatenation in the bank of registers during the following clock half-cycle.

Advantageously, the concatenation means comprise means for the parallel presentation, on the data path of the microprocessor, of the two binary words read in the back of registers, means for the selection of at least one bit to be concatenated of the first binary word and means to shift bits from the first binary word on the data path and insert at least the selected bit of the first binary word in the second binary word.

Advantageously, the means for shifting bits comprise a hardware wire-switching circuit organized so that, upon the reception of a shift signal, it shifts the rank of the wires of the data path and connects the output of the selection means of the bit to be concatenated to at least one wire of the data path.

According to one embodiment, the means for the selection of at least one bit comprise a multiplexer circuit arranged in the data path to receive the first binary word at input.

According to one embodiment, the second binary word is read in the bank of registers at the concatenation result recording address.

According to one embodiment, the microprocessor comprises means for decoding a compact concatenation instruction comprising a compact address for recording the result of the concatenation.

According to one embodiment, the microprocessor comprises means for decoding a concatenation instruction, the code of which comprises a predetermined compact address for recording the result of the concatenation.

According to one embodiment, the means for decoding the concatenation instruction are laid out to generate a fixed and predetermined address for recording the result of the concatenation.

BRIEF DESCRIPTION OF THE SEVERAL VIEWS OF THE DRAWINGS

These and other characteristics of the present invention shall be explained in greater detail in the following description, made on a non-restrictive basis, of an exemplary embodiment of a microprocessor according to the invention in relation with the appended figures, of which.

DETAILED DESCRIPTION OF THE INVENTION

Figure 1:
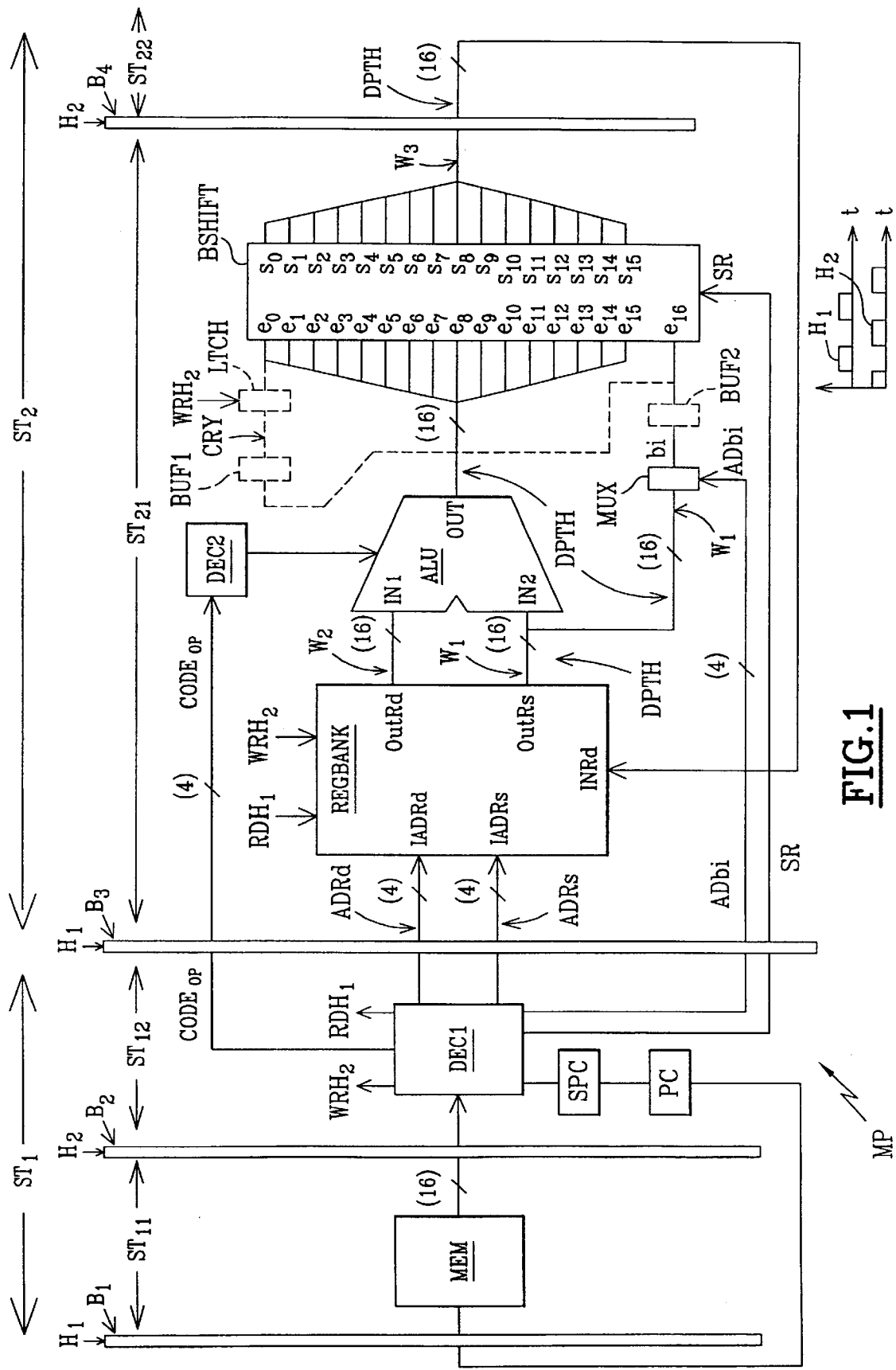
FIG. 1 gives a view, in the form of blocks, of the main elements of a microprocessor according to the invention.

FIG. 1 shows a microprocessor MP according to the invention. Here, it works with 16 bits and is of the pipeline type, namely with overlapping of instructions. The microprocessor is organized to execute compact instructions that take the following form:

| $CODE_{OP}$ | ADRd | ADRs | — |
|---|---|---|---|

These instructions, herein coded on 16 bits, comprise a code $CODE_{OP}$ of the operation to be executed, encoded on 4 bits, the address ADRd of a register Rd for the designation of the result, on 4 bits, and the address ADRs of a source register Rs on 4 bits (herein the last field of the instruction is not used). The operation is for example the addition ADD (add Rs and Rd and store the result in Rd), the subtraction SUB (subtract Rs from Rd and store the result in Rd), the logic OR (store the result of Rs OR Rd in Rd), the logic AND, etc.

According to the invention, the microprocessor is also organized to perform a compact concatenation instruction BMV according to the following format:

| $CODE_{BMV}$ | ADRd | ADRs | ADbi |
|---|---|---|---|

This instruction comprises the code $CODE_{BMV}$ of the concatenation operation on 4 bits, the address ADRd of the destination register Rd of the result of the concatenation on 4 bits, the address ADRs of a source register Rs on 4 bits, and the address (or rank) $ADb_i$ of a bit $b_i$ of the source register Rs.

This instruction herein means, non-exhaustively:

1) read a binary word W1 in the register Rs,
2) read a binary word W2 in the register Rd,
3) concatenate ("attach") the bit $b_i$ of the binary word W1 with the most significant bit of the binary word W2,
4) register, in the register Rd, the word W3 comprising the result of the concatenation.

As shall be seen further below, these various steps are advantageously performed in a single clock cycle.

A description shall be given first of all of the general structure of the microprocessor according to the invention which comprises a program memory MEM, a bank of registers REGBANK, an arithmetic and logic computation unit ALU, an ordinal counter PC, a circuit SPC for the incrementation of the ordinal counter PC and an instruction decoder DEC1. The microprocessor also comprises concatenation means taking the form of a shift circuit BSHIFT and a selection circuit MUX for the selection, as a function of the address $ADb_i$, of the bit $b_i$ to be concatenated.

The decoder DEC1, the unit ALU and the bank REGBANK shown in the form of blocks are circuits or sets of circuits well known to those skilled in the art and their internal structure shall not be described. The decoder DEC1 is connected to the output of the memory MEM to receive the instructions of a program to be executed. The unit ALU herein comprises two inputs IN1, IN2 and an output OUT, and is driven by a decoder DEC2. The bank of registers REGBANK contains various working registers, for example 16 registers R0 to R15 (not shown). The bank REGBANK has an input IADRs for the address ADRs of the source register Rs, an input IADRd for the address of the destination register Rd, an output OUTRs for the reading of the source register Rs, an output OUTRd for the reading of the destination register Rd, and an input INRd for the writing of a result in the destination register Rd. The output OUTRd of the bank REGBANK is connected to the input IN1 of the unit ALU. The output OUTRs is connected to the input IN2 of the unit ALU and to the input of the circuit MUX.

The circuit BSHIFT has sixteen bit inputs $e_0$ to $e_{15}$ connected to the output OUT of the unit ALU, an auxiliary input $e_{16}$ connected to the output of the circuit MUX and sixteen bit outputs $s_0$ to $s_{15}$ forming the termination of the data field DPTH of the microprocessor, these outputs being connected to the input INRd of the bank REGBANK.

Thus, the data path DPTH of the microprocessor has, first of all, two sixteen-wire channels at the output of the bank REGBANK, then one sixteen-wire channel and one auxiliary wire at the input of the circuit BSHIFT and finally one sixteen-wire channel from the output of the circuit BSHIFT up to the input of the bank REGBANK.

Other connections of the termination of the data path DPTH can of course be envisaged, for example a connection to the memory MEM or to another data storage memory.

The circuit BSHIFT is driven by a signal SR. When this signal is at 0, the circuit BSHIFT is transparent and the outputs $s_{15}$ to $s_0$ copy the inputs $e_{15}$ to $e_0$. When the signal BSHIFT is at 1, the circuit shifts its outputs in relation to its inputs. The outputs $s_{14}$ to $s_0$ copy the inputs $e_{15}$ to $e_1$, respectively, and the output $s_{15}$ copies the auxiliary input $e_{16}$. In this case, the input $e_0$ is disconnected from the data path.

According to the invention, the microprocessor is furthermore organized into two pipeline stages ST1, ST2 that are contiguous, demarcated by latch registers (or latches) B1, B3. These latches B1, B3 are unlatched by the leading edge of a clock signal H1. The memory MEM and the decoder DEC1 are laid out in the first stage ST1. The bank REGBANK, the unit ALU and the microprocessor MUX and the circuit BSHIFT are laid out in the second stage ST2.

The two stages ST1, ST2 are each divided into two sectors ST11/ST12 and ST21/ST22 respectively. The sectors ST11/ST12 are demarcated by a register B2 laid out between the output of the memory MEM and the decoder DEC1. The sectors ST21/ST22 are demarcated by a register B4 laid out between the outputs $s_0$ to $s_{15}$ of the circuit BSHIFT and the input INRd of the bank REGBANK. The register B2 is a latch register unlatched by the leading edge of a signal H2 phase-shifted by 180° in relation to the signal H1. The register B4 is preferably a three-state buffer that is transparent when the signal H2 is at 1, and in the high impedance state when the signal H2 is at 0. Thus, the clock signal H1 synchronizes the transfer of the data from the stage ST1 to the stage ST2 and the signal H2 synchronizes the transfer of the data from the first sector ST11, ST21 to the second sector ST12, ST22 of each pipeline stage. To get a clearer picture, the clock signals H1 and transfer signal H2 are shown at the bottom of FIG. 1.

The bank REGBANK is controlled in read mode by a signal RDH1 and in write mode by a signal WRH2. These signals are sent by the decoder DEC1. The read signal RDH1 is sent when the clock signal H1 goes to 1 and the write signal WRH2 is sent when the signal H2 goes to 1. The bank REGBANK thus belongs, in read mode, to the first sector ST21 of the stage ST2 and, in write mode, to the second sector ST22 of the stage ST2.

Finally, the memory MEM delivers the instruction contained at the address given by the ordinal counter PC upon reception of the read signal RDH1.

To illustrate the working of the microprocessor according to the invention, reference shall be made for example to the following sequence of instructions:

(1) SUB R1,R2 (subtract R2 from R1 and store the result in R1), (2) BMV R0,R1,12 (concatenate in R0 the rank 12 bit contained in R1).

These instructions are delivered by the memory MEM in the following form:

| $CODE_{SUB}$ | ADR1 | ADR2 | — |
|---|---|---|---|
| $CODE_{BMV}$ | ADR0 | ADR1 | 12 |

The sequence is performed by the microprocessor according to the steps 1.1 to 1.4 and 2.1 to 2.4 described here below. The various operations performed during each of these steps takes place asynchronously depending on the flow of data through the elements of the microprocessor and are considered to be completed at the end of each step.

1.1—H1=1, H2=0, register B1 unlatched, sector ST11 active:

the decoder DEC1 sends the read signal RDH1 and the instruction SUB R1, R2 is read in the memory MEM.

1.2—H1=0, H2=1, register B2 unlatched, sector ST12 active:

the decoder DEC1 decodes the instruction SUB R1, R2 places the signal SR at 0, sends the addresses ADR1 and ADR2 to the bank REGBANK and sends the operation code $CODE_{SUB}$ of the subtraction to the unit ALU, the circuit SPC increments the ordinal counter PC.

1.3—H1=1, H2=0, register B3 unlatched, sector ST21 active:

the bank REGBANK receives the addresses ADR1, ADR2, the decoder DEC2 receives the code $CODE_{SUB}$ and the decoder DEC1 sends the read signal RDH1, the registers R1 and R2 are read and their contents applied to the inputs IN1, IN2 of the unit ALU, the unit ALU delivers the result of the subtraction [R1−R2].

1.4—H1=0, H2=1, register B4 transparent, sector ST22 active:

the decoder DEC1 sends the write signal WRH2, the circuit BSHIFT being transparent (SR=0), the result of the subtraction [R1−R2] is retrieved at the input INRd of the bank REGBANK, the result of the subtraction [R1−R2] is recorded in the register R1.

2.1—H1=1, H2=0, register B1 unlatched, sector ST11 active:

the decoder DEC1 sends the read signal RDH1 and the instruction BMV R0,R1,12 is read in the memory MEM.

2.2—H1=0, H2=1, register B2 unlatched, sector ST12 active:

the decoder DEC1 decodes the instructions BMV R0,R1, 12, sets the signal SR at 1, sends the addresses ADR1 and ADR2 to the bank REGBANK, sends the address $ADb_i$ =12 to the multiplexer MUX and sends the concatenation operation code $CODE_{BMV}$ to the unit ALU, the circuit SPC increments the ordinal counter PC.

2.3—H1=1, H2=0, register B3 unlatched, sector ST21 active:

the bank REGBANK receives the addresses ADR1, ADR2, the decoder DEC2 receives the code $CODE_{BMV}$, the circuit MUX receives the address $ADB_i$ (herein 12), the circuit BSHIFT receives the signal SR at 1 and the decoder DEC1 sends the read signal RDH1, the binary word W1 contained in the register R1 is applied to the input of the multiplexer MUX and the binary word W2 contained in the register R0 is applied to the input IN1 of the unit ALU, according to the invention, the unit ALU copies the word W2 present at its input IN1 at its output OUT, the multiplexer MUX selects the bit $b_{12}$ that is at the auxiliary input $e_{16}$ of the circuit BSHIFT, the circuit BSHIFT connects the outputs $s_{14}$ to $s_0$ to the inputs $e_{15}$ to $e_1$, connects the output $s_{15}$ to the auxiliary input $e_{16}$ and delivers a binary word W2 having the following form:

W3=$b_{12}$ $c_{15}$ $c_{14}$ $c_{13}$ $c_{12}$ $c_{11}$ $c_{10}$ $c_9$ $c_8$ $c_7$ $c_6$ $c_5$ $c_4$ $c_3$ $c_2$ $c_1$, wherein the most significant bit is the bit $b_{12}$ selected in the word W1. The other bits of the word W3 are bits $c_{15}$ to $c_1$ of the word W2, the least significant bit $c_0$ having been eliminated by the shift.

2.4—H1=0, H2=1, buffer B4 transparent, sector ST22 active:

the word W3 is applied to the input INRd of the bank REGBANK, the decoder DEC1 sends the write signal WRH2 and the word W3 is recorded in the register R0 of the bank REGBANK.

In the pipeline microprocessor according to the invention, the steps that have just been described overlap as shown in the following table:

TABLE 1

| Pipeline cycle | | Pipeline cycle | | Pipeline cycle | |
|---|---|---|---|---|---|
| ½ cycle | ½ cycle | ½ cycle | ½ cycle | ½ cycle | ½ cycle |
| H1 = 1 | H2 = 1 | H1 = 1 | H2 = 1 | H1 = 1 | H2 = 1 |
| step 1.1 | step 1.2 | step 1.3 | step 1.4 | | |
| | | step 2.1 | step 2.2 | step 2.3 | step 2.4 |
| | | | | step 3.1 | step 3.2 |

In this table, the steps 3.1 and 3.2 are steps for reading and decoding a new instruction (any new instruction) according to the instruction BMV.

It can be seen that the steps 2.3 and 2.4 are performed in a single clock cycle. Furthermore, owing to the pipeline operation of the microprocessor, the read step 2.1 and decoding step 2.2 overlap the steps 1.3 and 1.4 of the previous instruction and do not use up any clock time.

Figure 2:
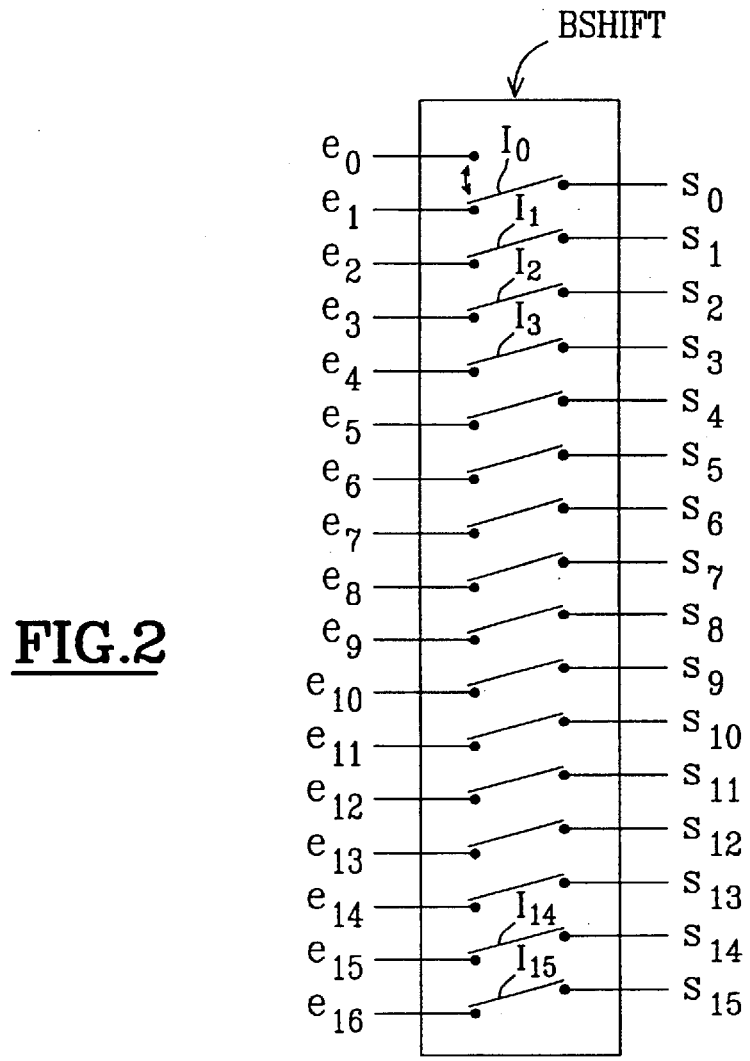
FIG. 2 shows a shift circuit according to the invention shown schematically in FIG. 1.
Figure 3:
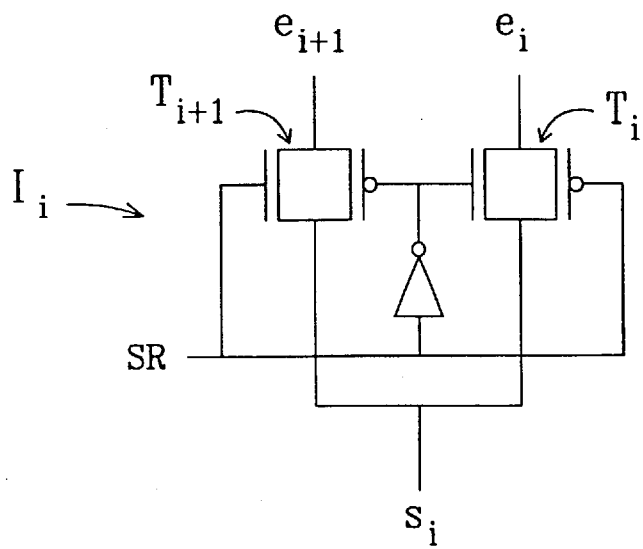
FIG. 3 shows a switch element of the shift circuit of FIG. 2.

FIG. 2 shows an advantageous embodiment of the circuit BSHIFT, by means of sixteen switches I0 to I15 controlled by the signal SR. Each switch $I_i$ is laid out to connect an output $S_i$ with a rank i to an input $e_i$ of the same rank or to a higher-ranking input $e_{i+1}$, depending on the value of the signal SR. As shown in FIG. 3, the switches $I_i$ can be made by means of two CMOS switches $T_i$ and $T_{i+1}$ laid out between the output $S_i$ and the inputs $e_i$ and $e_{i+1}$. The signal SR is applied to the NMOS transistor of the switch $T_{i+1}$ and to the PMOS transistor of the switch $T_i$. An inverse signal /SR, delivered by an inverter gate is applied to the PMOS transistor of the switch $T_{i+1}$ and to the NMOS transistor of the switch $T_i$.

This hardware wire-switching bit shift circuit BSHIFT has the advantage, as compared with a standard shift register, of enabling the reception of the shift signal SR at the beginning of the clock signal H1 before the data elements are stabilized at the inputs $e_{16}$ to $e_0$. It is possible, however, to provide for a standard shift register on condition that there is a delay circuit designed to apply the signal SR.

To give a clear idea of the practical applications of the invention, Table 2 here below describes the following concatenation sequence:

"Concatenate in R0=1010 1010 1010 1010 the bit 12 of R1=0001 0010 0011 0100, then the bit 0 of R2=0010 0011 0100 0101, then the bit 14 of R3=0011 0100 0101 0110, then the bit 2 of R1=0001 0010 0011 0100".

tion register Rd (herein R0) into action. After sixteen concatenations, this register is full. If it is desired to produce concatenated bit strings of great length, for example with 16, 32, 64 bits or more, it is possible to change the destination register Rd after each cycle of 16 concatenations. Another approach consists in keeping the same register Rd by saving its contents after each cycle of 16 concatenations. Thus, one alternative of the invention enabling a further simplification of the instruction BMV format consists in imposing the address of the destination register Rd. In this case, the instruction BMV is encoded as follows:

| $CODE_{BMV}$ | ADRs | ADbi |
|---|---|---|

In this case, the address ADRd of the register Rd, for example the address R0, is generated automatically by the decoder DEC1 upon reception of the code $CODE_{BMV}$. The address ADRd can also be included in the code $CODE_{BMV}$ which can then be encoded on 8 bits instead of 4.

It will clearly be seen by those skilled in the art that the present invention is open to numerous other alternative embodiments and improvements.

In particular, as indicated by lines of dashes in FIG. 1, the least significant bit present at the input $e_0$ of the circuit BSHIFT can be kept by means of a latch register LTCH as a flag CRY ("carry" bit) of the microprocessor. The output of the latch register LTCH contains the flag CRY and is connected to the input $e_{16}$ of the circuit BSHIFT by means of a buffer BUF1 for the possible injection of the flag CRY into the data path. A second buffer BUF2 is interposed between the output of the circuit MUX and the input $e_{16}$ to prevent collisions between the selected bit $b_i$ and the flag CRY. The decoder DEC1 drives the buffers BUF1 and BUF2 as a function of the type of instruction received. Also, the decoder DEC1 sends the write signal WRH2 to the register LTCH for the updating of the flag CRY at the activation of the sector ST22 when a rightward shift has been performed in the sector ST21 during the previous clock half-cycle.

Furthermore, the circuit BSHIFT can be used to carry out arithmetic operations such as division or multiplication which, in a standard way, require bit shifts. Otherwise, the circuit BSHIFT can be positioned at other points of the data path, for example between the output OUTRd of the bank REGBANK and the input IN1 of the unit ALU.

TABLE 2

| | | REGISTER R0 | | | | | | | | | | | | | | | | |
|---|---|---|---|---|---|---|---|---|---|---|---|---|---|---|---|---|---|---|
| Bits (rank) | | 15 | 14 | 13 | 12 | 11 | 10 | 9 | 8 | 7 | 6 | 5 | 4 | 3 | 2 | 1 | 0 | |
| R0 initial | | 1 | 0 | 1 | 0 | 1 | 0 | 1 | 0 | 1 | 0 | 1 | 0 | 1 | 0 | 1 | 0 | |
| BMV R0, R1, 12 | 1 | 1 | 0 | 1 | 0 | 1 | 0 | 1 | 0 | 1 | 0 | 1 | 0 | 1 | 0 | 1 | *0* | |
| BMV R0, R2, 0 | 1 1 | 1 | 0 | 1 | 0 | 1 | 0 | 1 | 0 | 1 | 0 | 1 | 0 | 1 | 0 | *1* | *0* | |
| BMV R0, R3, 14 | 0 1 1 | 1 | 0 | 1 | 0 | 1 | 0 | 1 | 0 | 1 | 0 | 1 | 0 | 1 | *0* | *1* | *0* | |
| BMV R0, R1, 2 | 1 0 1 1 | 1 | 0 | 1 | 0 | 1 | 0 | 1 | 0 | 1 | 0 | 1 | 0 | *1* | *0* | *1* | *0* | |

The concatenated bits in the register R0 are in bold characters. The bits in Italics are the least significant bits lost by rightward shift. In all, the concatenation of the four bits necessitates only four pipeline clock cycles and one program of four instructions only.

The sequence described by the Table 2 shows that a repetitive concatenation operation brings the same destina- Also, it is clear that the concatenation of the bit $b_i$ can also be done by the insertion of the bit $b_i$ as a least significant bit at the input $e_0$ of the circuit BSHIFT and the leftward rotation of the bits of the binary word W2.

Furthermore, the operation of concatenation of the bit $b_i$ can be extended simply to the simultaneous concatenation of several bits of the source register Rs, selected simultaneously by the circuit MUX. For example, providing for several cascade-connected circuits BSHIFT may make it possible to chose between the concatenation of only one bit, two bits at a time, three bits, etc. The choice of the number of bits to be concatenated may be encoded in the field $CODE_{BMV}$ of the instruction.

In general, here above, various characteristics have been described of a microprocessor enabling the acceleration and simplification of the computer programs comprising numerous concatenation operations. These characteristics may be summarized non-exhaustively and non-restrictively as follows:

i) the providing of a concatenation instruction and means to decode and process this instruction, enabling a simplification of the writing of the programs and an acceleration of their execution, ii) the providing of an instruction of this kind in compact form incorporating at least one read address of a bit to be concatenated and the rank of this bit, enabling the acceleration of the reading and the processing of the instruction, iii) the reading of the words W1, W2 and the recording of the result W3 in the register bank REGBANK of the microprocessor, enabling a reduction in the size of the address fields of the instruction, iv) the on-line execution of the concatenation operation on the data path of the microprocessor, in one clock cycle, with a parallel presentation of the words W1 and W2, v) the performance of the three read steps of the words W1, W2, for the execution of the concatenation and recording of the result W3 during the same clock cycle, through the division of the second pipeline stage into two complementary sectors, vi) the providing of a hardware wire-switching circuit BSHIFT, capable of being controlled asynchronously at the beginning of the clock cycle, without waiting for the data to be stabilized.

With regard to the characteristic iii), it must be noted that the compact addresses contained in the instructions can also be used to address the memory array of the microprocessor. In this case, these addresses must be converted into real addresses of the memory array by an address converter known as a memory management unit or MMU.

Furthermore, those skilled in the art will note that the microprocessor according to the invention is a particularly simple structure that ensures low current consumption. An additional measure to limit the consumption of power consists in placing buffer circuit at the outputs OUTRs and OUTRd of the bank REGBANK, these buffer circuits being driven by a signal H1' offset by a duration t in relation to the signal H1. In this way, the unit ALU is connected to the outputs OUTRs, OUTRd only when they are stabilized. The offset signal H1' may be obtained simply by means of a delay circuit, for example cascade-connected inverter gates.

Finally, it will be clear to those skilled in the art that the term "clock half-cycle" should not be interpreted in restrictively. Indeed, at constant operating speed, an equivalent approach would be to provide for a clock signal having double speed and to activate the pipeline sectors only during one in every two cycles, by offsetting the activation of each sector in relation to the following sector by one clock cycle. For each pipeline register B1 to B4, the selection of one out of every two clock bits as a control signal may be done simply by means of a frequency divider circuit, for example a D type flip-flop circuit whose /Q output is brought to the D input. The control signals of the pipeline registers may furthermore be combined into XOR gates before being applied, in order to ensure that two complementary sectors of one and the same pipeline stage will not be activated simultaneously.

I claim:

1. Microprocessor (MP) comprising means to decode (DEC1) an instruction (BMV) for concatenation of at least one bit ($b_i$) of a first binary word (W1) with at least one bit of a second binary word (W2), a bank of registers (REGBANK) and means (REGBANK, MUX, BSHIFT) to process the concatenation instruction, wherein the microprocessor comprises:

a first pipeline stage (ST1) comprising means for decoding (DEC1) the concatenation instruction;

a second pipeline stage (ST2) contiguous to the first stage, comprising a first sector (ST21) comprising concatenation means (OUTRd, OUTRs, MUX, BSHIFT) in which the bank of registers (REGBANK) is laid out in read mode and a second sector (ST22) in which the bank of registers (REGBANK) is laid out in write mode, the first sector being active at each clock half-cycle of the microprocessor and the second sector being active at each following clock half-cycle, the means for processing the concatenation instruction being arranged to read the first (W1) and second (W2) binary words in a bank of registers (REGBANK) and execute the concatenation instruction during a first clock half-cycle; and register a result (W3) of the concatenation in the bank of registers (REGBANK) during each following clock half-cycle.

2. Microprocessor according to claim 1, wherein the means (REGBANK, MUX, BSHIFT) to process the concatenation instruction (BMV) comprise:

means (OUTRd, OUTRs) for the parallel presentation, on a data path (DPTH) including wires of the microprocessor, of the two binary words (W1, W2) read in the bank of registers (REGBANK), means (MUX) for the selection of at least one bit ($b_i$) of the first binary word (W1) to be concatenated, and means (BSHIFT) to shift bits from the second binary word (W2) on the data path (DPTH) and insert at least the selected bit ($b_i$) of the first binary word (W1) in the second binary word (W2).

3. Microprocessor according to claim 2, wherein said bit-shifting means comprise a hardware wire-switching circuit (BSHIFT) organized so that, upon the reception of a shift signal (SR), it shifts the rank of the wires of the data path (DPTH) and connects the output ($e_{16}$) of the means (MUX) for the selection of the bit ($b_i$) to be concatenated to at least one wire ($s_{15}$) of the data path.

4. Microprocessor according to claim 2, wherein the means for the selection of at least one bit comprise a multiplexer circuit (MUX) laid out on the data path (DPTH) to receive the first binary word (W1) at input.

5. Microprocessor according to claim 1, wherein the second binary word (W2) is read in the bank of registers (REGBANK) at a concatenation result (W3) recording address (ADRd).

6. Microprocessor according to claim 1, comprising means for decoding (DEC1) a compact concatenation instruction (BMV) comprising a compact address (ADRd) for recording the result (W3) of the concatenation.

7. Microprocessor according to claim 1, comprising means for decoding (DEC1) a concatenation instruction (BMV), a code ($CODE_{BMV}$) of which comprises a predetermined compact address (ADRd) for recording the result of the concatenation.

8. Microprocessor according to claim 1, wherein the means (DEC1) for decoding the concatenation instruction (BMV) are laid out to generate a fixed and predetermined address (ADRd) for recording the result (W3) of the concatenation.

* * * * *